J. KEPLINGER.
AUTOMATIC SLUICE GATE.

No. 105,220.    Patented July 12, 1870.

Witnesses.
A. L. Peck.
E. S. Peck.

Inventor.
Jacob Keplinger
by his Atty.
H. P. K. Peck.

United States Patent Office.

JACOB KEPLINGER, OF FARMERSVILLE, OHIO.

Letters Patent No. 105,220, dated July 12, 1870.

AUTOMATIC SLUICE-GATE.

The Schedule referred to in these Letters Patent and making part of the same

*To all whom it may concern:*

Be it known that I, JACOB KEPLINGER, of Farmersville, in Montgomery county, Ohio, have invented a new and useful Improvement in Automatic Sluice-Gates; and I do hereby declare that the following is a full and exact description thereof, reference being had to the accompanying drawings and to the letters of reference marked thereon.

In the accompanying drawings—

Figure 1:
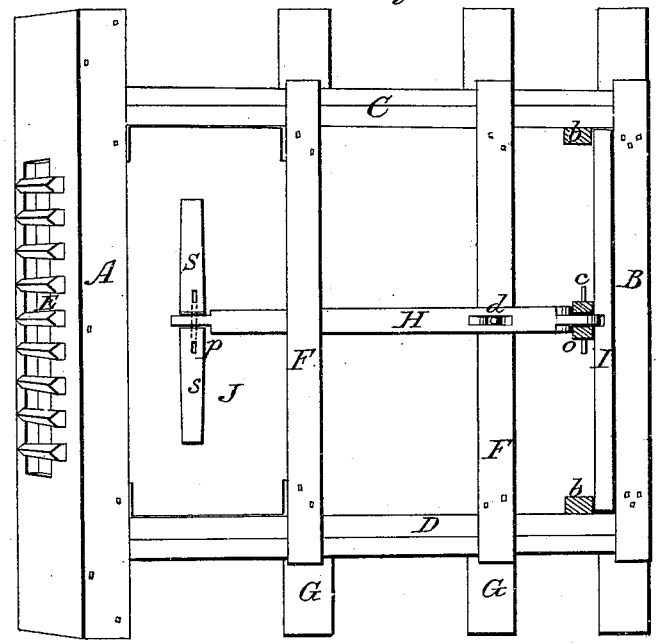
Figure 1 represents a top or plan view of my improvement.

A B C D denote a sluice-way, provided with bars E, in front, in the usual manner, to prevent floodwood from entering with the water.

The arrows *a a* denote the direction of the flow of water through the sluice-way.

The sluice-way is firmly supported with framework F G.

Within the sluice-way there are suspended from the pivoted lever H the gate I and float J.

The gate I is held in contact with the front framework of the sluice-way by cleats *b*, and it is connected by the adjustable pin *c* with the lever H.

This lever H rests upon one of the frame-pieces F, and is provided with a suitable elongated aperture for the pin *d*, which projects from frame-piece F, in which it is inserted.

There is a slotted piece of timber, O, fastened to the gate, provided with a series of holes for adjusting the gate to different relative heights.

The float J is connected to the front end of lever H by a pivot-pin, *p*, through the two connecting-pieces *s s* and the end of the lever, as represented in the drawings.

The object of my invention is to gauge and regulate the quantity of water which may pass through the sluice-way under all the differing degrees of height of the water in the forebay.

Figure 2:
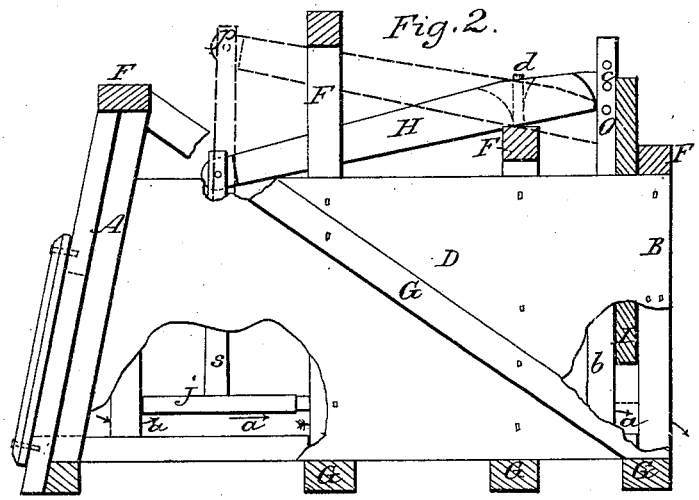
Figure 2 represents a side elevation, with parts broken away to exhibit the gate and float.

It will be observed that the entire stream or flow of water will pass freely through the sluice-way when its stage is low, as indicated in fig. 2 of drawings, the float J being at a lower position than the bottom edge of the gate I; but, as the water elevates the float J, the gate I will be correspondingly forced downward, and the quantity of water will still pass beneath it, the flow being increased in speed by the increased elevation within the forebay or sluice-way.

Having fully described my improvement in automatic sluice-gates,

What I claim, and desire to secure by Letters Patent, is—

The combination of the gate I, float J, and lever H, connected, arranged, and operating in the sluice-way A B C D, in the manner and for the purpose substantially as described.

In testimony whereof I have hereunto set my hand this 6th day of April, A. D. 1869.

JACOB KEPLINGER.

Witnesses:
 H. P. K. PECK,
 A. L. PECK.